United States Patent [19]

Findeisen

[11] 3,879,635

[45] Apr. 22, 1975

[54] CONVERGENCE AND TRIAD DISTORTION CORRECTION MEANS FOR WIDE ANGLE CATHODE RAY TUBE

[75] Inventor: Bennie A. Findeisen, Baldwinsville, N.Y.

[73] Assignee: General Electric Company, Syracuse, N.Y.

[22] Filed: Feb. 6, 1973

[21] Appl. No.: 330,053

[52] U.S. Cl. .................................. 315/368; 315/371

[51] Int. Cl. ......................... H01j 29/70; H01j 29/56

[58] Field of Search . 315/13 C, 13 R, 27 R, 27 XY; 335/210–213

[56] References Cited

UNITED STATES PATENTS

| | | | |
|---|---|---|---|
| 3,375,389 | 3/1968 | Hughes | 335/213 |
| 3,430,099 | 2/1969 | Ashley | 315/13 C |
| 3,622,835 | 11/1971 | Parker | 315/13 C |

*Primary Examiner*—Maynard R. Wilbur
*Assistant Examiner*—J. M. Potenza
*Attorney, Agent, or Firm*—Marvin Snyder

[57] ABSTRACT

Improved dynamic convergence means and triad distortion correction means which may advantageously be formed upon the core of a deflection yoke of a color television cathode ray tube. The dynamic convergence means includes six windings disposed upon an annular core about the tube neck to form a hexagonal set of magnetic flux paths which deflect beams disposed in a delta or triangular array radially outward from the center of the array. A combination of horizontal- and vertical-rate signals are applied to vary the convergence as a function of beam deflection. Beam triad distortion is corrected by providing four correction windings upon a common core with the convergence means such that a quadrilateral flux pattern is produced within the tube neck. Horizontal- and vertical-rate signals are applied to the distortion correction windings for expanding the beam array in a first direction, and compressing it in a second direction perpendicular to the first. The triad distortion correction means flux paths may be oriented generally parallel to the sides of the cathode ray tube viewing screen and formed on a common core with a deflection yoke which produces negligible triad distortion along the diagonals of the viewing screen. In another embodiment, a second distortion correction means is provided for producing magnetic fields oriented at substantially 45° to those of the first distortion correction means. A combination of horizontal- and vertical-rate currents are applied to compensate for triad distortion along the diagonals of the viewing screen.

19 Claims, 7 Drawing Figures

CONVERGENCE AND TRIAD DISTORTION CORRECTION MEANS FOR WIDE ANGLE CATHODE RAY TUBE

BACKGROUND OF THE INVENTION

The present invention relates to color television receivers and, more particularly, to means for controlling the relative position of a plurality of electron beams arrayed in a delta or triad configuration within a color television cathode ray tube.

A number of systems have been devised for producing color images upon the viewing screen of a television receiver. The type which has achieved dominance, however, involves the use of electron gun means which produce three electron beams arrayed in a predetermined pattern. Dots of phosphors of three different types are arranged in repeating patterns upon the inner surface of a faceplate or viewing screen of a cathode ray tube, the dot patterns matching the electron beam array such that each electron beam energizes only those dots composed of a phosphor which produces light of a single color.

Magnetic deflection means are provided for bending or deflecting the arrayed electron beams so that they are periodically swept over the inner surface of the viewing screen. To assist in aligning the arrayed beams, and to shield the sets of dots from stray portions of the beams, an apertured mask is disposed behind the viewing screen such that as the arrayed beams pass through an aperture, they will impinge upon only a predetermined group of dots.

In order to cause the arrayed beams to pass through common apertures, the beams must be converged upon a point lying in the plane of the shadow mask. Static convergence, i.e., that which occurs in the absence of beam deflection, may be achieved by both the initial orientation of the electron guns and by magnetic fields set up in the tube neck by means of permanent magnets. However, as deflection takes place the distance from the center of deflection to the shadow mask varies so that the initial, static convergence is incorrect and a time-varying or dynamic convergence mechanism must be provided. The dynamic convergence means which are commonly provided in present-day color cathode ray tubes usually include wire-wound magnetic cores which are in magnetic communication with other elements, termed pole shoes, located within the neck of the cathode ray tube. Time-varying signals are applied to the convergence windings to modulate the magnetic fields arising between the various pole shoes. However, this arrangement necessitates pole shoes attached to or supported by the electron gun assembly, complicating the design and necessitating an elongate tube neck.

While properly-designed dynamic convergence means may operate well enough to ensure the passage of all three beams through common mask apertures at any given time, the grouping of the beams is susceptible of substantial variation. As deflection increases, thhe various electron beams travel unequal distances through the magnetic fields and the relative position of the beams changes. This aberration, termed triad beam landing distortion or simply triad distortion, modifies the grouping of the beams such that they no longer intercept the viewing screen in an equilateral triangle and thus cannot impinge properly upon phosphor dots which are arrayed in this pattern. While attempts have been made to correct triad distortion by means of compensating pre-deflection magnetic fields, as the maximum deflection angles are increased beyond 90° the aberrations are accentuated so that in some cases it has been necessary to deposit the phosphor dots in patterns which correspond to the aberrant beam grouping. However, as the phosphor dot patterns deviate from the preferred equilateral triangle, the dots cannot be packed as closely as before and thus the gaps between them expand, producing a decline in picture brightness.

It will therefore be seen that it would be desirable to provide improved means for dynamically converging electron beams arrayed in a delta configuration, and for correcting triad beam landing distortion arising in the array due to the deflection thereof.

It is therefore an object of the present invention to provide improved convergence and triad distortion correction means.

It is another object to provide compact convergence and distortion correction means which may be disposed at a common point along the neck of a cathode ray tube.

It is still another object of the invention to provide improved convergence and distortion correction means which do not require a specially-designed deflection yoke.

It is a further object to provide convergence and distortion correction means for a triad of electron beams which may be formed upon a common core with deflection windings.

It is a further object of the present invention to provide means for maintaining the grouping of a triad of electron beams in the presence of deflection angles exceeding 90°.

SUMMARY OF THE INVENTION

Briefly stated, in accordance with one aspect of the invention the foregoing objects are achieved by providing a first set of windings disposed about the neck of a cathode ray tube for producing a field therewithin characterized by lines of flux disposed in a substantially hexagonal array. Means are provided to apply current to the windings which varies in synchronism with the deflection of the electron beams so that beam convergence is modified as a function of beam position. Triad distortion correction means are disposed about the tube neck for providing a magnetic field therein characterized by flux lines arrayed in a substantially quadrilateral configuration. In a preferred embodiment the cathode ray tube has a deflection yoke associated therewith which produces practically no triad distortion along the diagonals of the viewing screen. Currents are applied to the distortion correction means which vary as a function of horizontal and vertical beam deflection for correcting triad distortion in areas of the viewing screen between the diagonals thereon.

In another embodiment a deflection yoke is used which produces substantial triad distortion along the screen diagonals. Second distortion correction means are provided and oriented at substantially 45° to the first correction means to provide triad distortion correction over the entire viewing screen.

In both embodiments, the convergence and distortion correction windings may advantageously be disposed upon a common core with the deflection windings, eliminating the need for a separate dynamic convergence assembly and allowing a reduction in the length of the cathode ray tube.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which:

DESCRIPTION OF THE PREFERRED EMBODIMENTS

Figure 1:
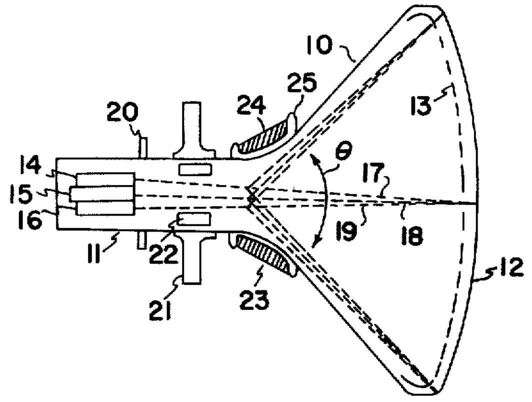
FIG. 1 is a sectional view of a color cathode ray tube and associated prior-art deflection and convergence means.

FIG. 1 shows, in simplified form, a typical color cathode ray tube 10 including a neck portion 11 and a faceplate or viewing screen 12. An apertured shadow mask 13 is mounted within the cathode ray tube directly behind viewing screen 12. A plurality of electron guns 14, 15 and 16 are mounted within the distal end of neck portion 11 and produce electron beams 17, 18 and 19 for energizing phosphor dots disposed upon the inside surface of viewing screen 12 (not shown). Static convergence means 20, typically comprised of permanent mangnetic means adjustably mounted adjacent the neck portion 11 of the tube, are provided to cause the undeflected electron beams to converge at a point lying in the plane of aperture mask 13.

In order to maintain proper convergence of the electron beams despite the varying beam path lengths which occur during beam deflection, dynamic convergence means 21 are provided. The dynamic convergence means usually comprise core means having windings thereon which receive time-varying currents for periodically varying beam convergence. A set of magnetic elements 22, commonly denominated pole shoes, are disposed within the neck of the cathode ray tube to transmit the magnetic field created by dynamic convergence means 21 to the region of the electron beams. A deflection yoke 23 is mounted over the neck portion 11 of the cathode ray tube.

The deflection yoke illustrated is of the so-called "saddle" type and comprises an annular magnetic core 24 and a set of saddle-shaped windings 25 mounted therein. The deflection windings ordinarily comprise two sets of coils oriented to periodically deflect electron beams 17, 18 and 19 over the surface of viewing screen 12. The beams are deflected over an included angle $\theta$, which attains a maximum value in a plane intercepting a diagonal of the viewing screen. While the maximum included angle has in the past often approximated 70°, with the advent of improved deflection means and the demand for shorter cathode ray tubes to allow smaller television receiver cabinets the maximum included angle $\theta$ has expanded to substantially 90°. In some cases, tubes have been built for a maximum included angle $\theta$ of approximately 114°, shortening the overall length of the cathode ray tube still further. However, it has been found that as the included angle increases, deflection-related aberrations increase rapidly. More particularly, it becomes much more difficult to maintain the proper convergence or overall group size of the electron beam array. Further, an aberration known as triad beam landing distortion, or simply triad distortion, occurs to a heightened degree. Triad distortion may be defined as a variance in the grouping or position of the electron beams relative to one another. Triad distortion may therefore be distinguished from a related aberration termed misconvergence, in which individual electron beams depart from the grouping to such an extent that they traverse different apertures in shadow mask, illuminating phosphor dots of different groups. The means disclosed herein are intended primarily to effect the proper convergence of the arrayed electron beams and to correct the triad distortion thereof, rather than compensating for gross aberrations such as misconvergence.

Figure 2:
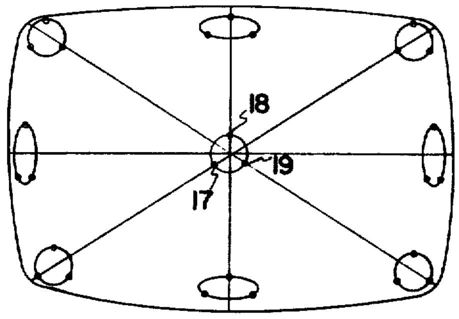
FIG. 2 is an illustration of electron beam grouping aberrations experienced upon the viewing screen of a cathode ray tube utilizing a preferred form of deflection yoke.

While it is extremely difficult to entirely eliminate triad distortion by changes in the deflection yoke alone, frequently the areas of the viewing screen upon which distortion appears may be predetermined such that triad distortion in certain areas may be virtually eliminated at the expense of heightened distortion in other areas. FIG. 2 represents one such optimization or tradeoff in which the windings of a deflection yoke have been distributed in a manner to provide only insignificant triad distortion along the diagonals of a viewing screen, relegating the most acute distortion to loci corresponding to the horizontal and vertical centerlines of the screen. The greatest aberrations thus occur at the extremities of the horizontal and vertical centerlines of the viewing screen. It will be seen that at the ends of the horizontal centerline of the viewing screen triad distortion is encountered which produces a vertical elongation and a lateral compression of the beam grouping or triad. Conversely, at the ends of the vertical centerline of the viewing screen the triad experiences a lateral expansion, and a vertical compression.

Figure 3:
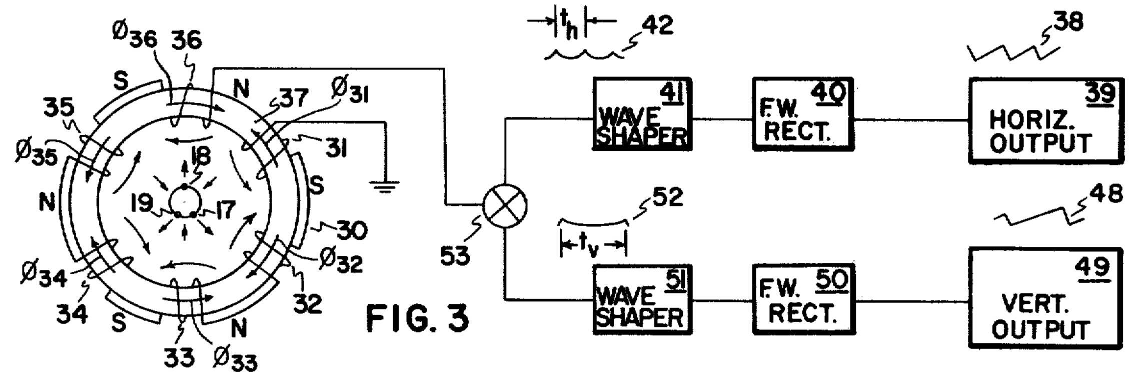
Fig. 3 is an idealized schematic diagram of an improved convergence means and energizing system therefore.

Referring now to FIG. 3, there is shown improved means 30 for dynamically converging the three beams 17, 18 and 19 of a cathode ray tube of the type shown in FIG. 1. A plurality of windings 31, 32, 33, 34, 35 and 36 are disposed at regular intervals about an annular core 37 which is made of a suitable magnetic material, such as ferrite. Windings 31–36 are formed by turns of wire wound in alternating directions for each successive group of turns or windings. The fluxes $\phi_{31}$ – $\phi_{36}$ produced in core 37 by windings 31–36, respectively, thus alternate in direction for successive windings. This produces alternate N and S magnetic poles about annular core 37, and gives rise to flux lines within the neck of the cathode ray tube which are disposed in a substantially hexagonal array. While it is recognized that the fluxes surrounding a solenoidal group of turns, such as any one of windings 31–36, are not truly parallel with the axis of the winding, but instead tend to increase in curvature with distance from the winding toward the center of the region bounded by core 37, those lines of flux nearest the winding are substantially parallel thereto. Therefore, for ease of description the illustrated magnetic field will be considered to be characterized by flux lines disposed in a substantially hexagonal array.

When a stream of electrons traverses a magnetic field, the stream is deflected in a direction perpendicular to both the original line of travel, and the flux field. In the illustration of FIG. 3 it will be considered that electron beams 17, 18 and 19 are directed out of the Figure toward the viewer, as if seen from the viewing screen of a cathode ray tube. In accordance with the well known right-hand rule, it will be understood that electron beam 18 interacts with field $\phi_{36}$ and is deflected upwardly, radially outward from the center of the electron beam array. Similarly, alternate windings 32 and 34 produce fluxes which act upon electron beams 17 and 19, respectively, to cause them to be deflected radially outwardly from the center of the array. Alternate windings 31, 33 and 35 produce fluxes directed oppositely to those produced by windings 32, 34 and 36 and thus serve to prevent circulation of the fluxes of the even-numbered windings within the annular core. Because of the specific orientation of windings 31, 33 and 35, the magnetic fields produced thereby do not encompass the electron beams and hence exert no force thereon. Electron beams 17, 18 and 19 are thus deflected radially outwardly in a uniform manner, enlarging the triangular array without disturbing the symmetry thereof.

Means are shown for deriving time-varying current for operating dynamic convergence means 30 in synchronism with deflection of the arrayed electron beams. Sawtooth-like horizontal deflection signals 38 are derived in a horizontal scansion signal output stage 39 and applied to a full wave rectifier 40. The rectified pulses are then transmitted to a wave shaper 41 which advantageously comprises reactive elements for imparting a substantially parabolic characteristic thereto. The resulting signal, illustrated at 42, advantageously has maxima occuring at the beginning and end of each horizontal scansion period $t_h$ so that the effect of convergence means 30 on the electron beams is felt most strongly at the sides of the viewing screen. Similarly, a train of sawtooth signals 48 occuring at the vertical deflection rate is derived from a vertical output stage 49 and rectified in a full wave rectifier 50. A wave shaper 51 imparts a substantially parabolic characteristic to the signal, resulting in waveform 52, such that the maximum effect produced by the convergence means 30 on the electron beams and occuring at the vertical scansion rate arises at the beginning and end of vertical scansion period $t_v$. The beginning and end of vertical scansion correspond to the upper and lower edges of the viewing screen, respectively, when vertical deviation from the statically-converged central position is greatest. Summer 53 receives both the vertical- and horizontal-rate signals and applies the summed waveforms to the series-connected windings of convergence means 30. The intensity of the hexagonally-arrayed fluxes is thus caused to vary at both the horizontal and the vertical deflection rates, modifying the convergence characteristics of electron beams 17, 18 and 19 as a function of deflection or, equivalently, beam position.

Figure 4:
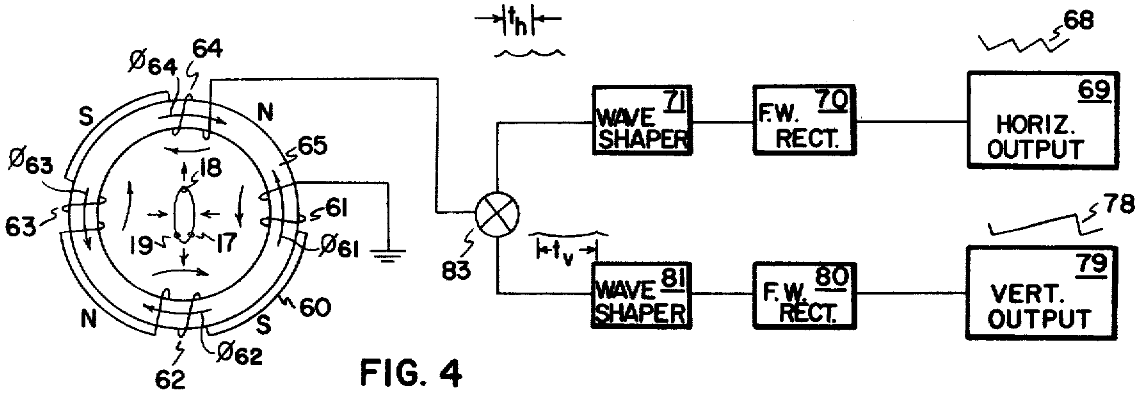
FIG. 4 is an idealized schematic diagram of an improved triad distortion correction means, and energizing system therefore.

Referring now to FIG. 4, improved triad distortion correction means 60 are shown which may advantageously be used in conjunction with convergence means 30. Triad correction means of the type shown in FIG. 4 are described and claimed in copending United States patent application Ser. No. 243,670 filed Apr. 13, 1972 by the inventor of the embodiment claimed herein and assigned to the present assignee. Triad distortion correction means 60 comprises a set of four windings 61, 62, 63 and 64 disposed substantially 90° apart upon an anular magnetic core 65 which, conveniently, may comprise the same core supporting the dynamic convergence windings shown in FIG. 3. Windings 61–64 are connected in series, and alternate windings are wound upon core 65 in opposite directions such that opposing fluxes are produced by adjacent windings. The net effect is to produce a magnetic field having lines of flux disposed in a quadrilateral array. Although it is recognized that fluxes $\phi_{61} - \phi_{64}$ produced by windings 61–64, respectively, exhibit increasing curvature with distance from the winding toward the center of the region bounded by core 65, the lines of flux nearest the winding are essentially parallel thereto; hence, for ease of description the pattern will be referred to as quadrilateral. The flux pattern thus created produces four magnetic poles of alternate polarity disposed in a substantially rectangular array about the neck of a cathode ray tube extending within the annular core.

Means for energizing windings 61–64 of the distortion correction means 60 include a source 69 of horizontal-rate signals 68 having a generally sawtooth configuration. A full wave rectifier 70 inverts one-half of each sawtooth waveform such that a train of pulses resembling equilateral triangles is produced, with the maxima occurring at the beginning and end of each horizontal scansion period $t_h$. A wave shaper 71 operates upon the triangular pulse train to impart a substantially parabolic curvature to the signal so that current rise and decline follows a parabolic, rather than linear, path. Vertical-rate sawtooth signals 78 are derived from a vertical output stage 79 and applied to a full wave rectifier 80 for inverting one-half of each sawtooth in the manner described above such that substantially triangular wave pulses are produced. A wave shaper 81 imparts a substantially parabolic curvature to the signal produced by rectifier 80 and a summer 83 sums the horizontal and vertical-rate signals, applying them to distortion correction means 60.

The quadrilateral flux array arising within the cathode ray tube neck and produced by windings 61–64 of the distortion correction means 60 serves to expand the beam array in a first direction, and compress it in a second direction perpendicular to the first. In particular fluxes $\phi_{62}$ and $\phi_{64}$, produced by windings 62 and 64, respectively, are oriented substantially horizontally in the neck of the tube. When upper beam 18 encounters flux $\phi_{64}$ the beam is deflected upwardly according to the well-known right-hand rule. Similarly, lower beams 17 and 19 traverse flux $\phi_{62}$ and are acted upon such that they are deflected downwardly by substantially equal amounts. Beam 18, situated substantially to intersect the vertical center line of the tube neck cross section, is not acted upon by the fluxes $\phi_{61}$ and $\phi_{63}$ produced by windings 61 and 63, respectively, since it is located substantially equidistant from both windings. Beam 17, however, is nearer winding 61 than winding 63 and hence is acted upon by flux $\phi_{61}$ such that it is deflected toward the vertical center line of the tube neck cross section. Similarly, beam 19 traverses flux $\phi_{63}$ and is also deflected toward the vertical center line of the tube neck cross section. If the locus of the original equilateral beam triad is taken to be a circle, it will be seen that upon the interaction of the electron beams and magnetic field of the distortion correction means 60 the beam pattern undergoes a vertical elongation and a lateral compression so that the beams may now be considered to lie along an ellipse whose major axis is oriented in a vertical direction.

If the direction of current through windings 61–64 is reversed, or equivalently if the windings are wound upon core 65 in opposite senses it will be understood that the deflection undergone by the arrayed electron beams will reverse. In this case, the beam array will experience a lateral or horizontal elongation and a vertical compression so that the locus of the beam triad, originally circular, will then correspond to an ellipse having its major axis oriented in a horizontal direction.

Referring again to FIG. 2, it will be seen that the aberrations illustrated therein correspond to those which may be induced in an equilateral beam triad by distortion correction means 60 of FIG. 4. More particularly, at the ends of the vertical centerline of the viewing screen, the beam array has undergone a vertical compression, and a horizontal elongation. This aberration may be compensated for by pre-distorting the beams in a complementary fashion. If the beam array is first acted upon by distortion correction means 60 of FIG. 4 so as to impart an initial vertical elongation and horizontal compression to the triad, the forces which tend to produce the triad distortion or astigmatism seen at the upper and lower ends of the vertical centerline in FIG. 2 can be entirely corrected for. Therefore, by directing current through the windings 61–64 of the astigmatism correction means 60 in a first direction, and modulating the current as a function of vertical deflection the vertically-related astigmatism may be completely compensated for.

A vertical elongation and a horizontal compression of the beam triad occcurs at the ends of the horizontal centerline of the viewing screen of FIG. 2 which may be counnteracted by a complementary vertical compression and horizontal elongation of the beam array by distortion correction means 60 of FIG. 4. Current directed oppositely to the vertical correction signal current, and modulated as a function of horizontal deflection, may be applied to windings 61–64 for producing an effect which complements the horizontally-related astigmatism as seen in FIG. 2. By adding oppositely-directed horizontal and vertical rate currents, and applying them to a single set of windings such as that of astigmatism correction means 60, bucking or nullification of the fields produced thereby will occur when horizontal and vertical currents are of an equal magnitude. By adjusting the magnitude of such currents, the nullification can be made to occur for equal percentages of total vertical and horizontal deflection, corresponding to the diagonals of the viewing screen. In the quadrants defined by the diagonals, however, either horizontal-rate or vertical-rate current will predominate such that a maximum triad distortion correction will occur at the ends of the horizontal and vertical centerlines. The beam landing aberrations illustrated in FIG. 2 may therefore be overcome by the system of FIG. 4, including distortion correction means 60.

Figure 5:
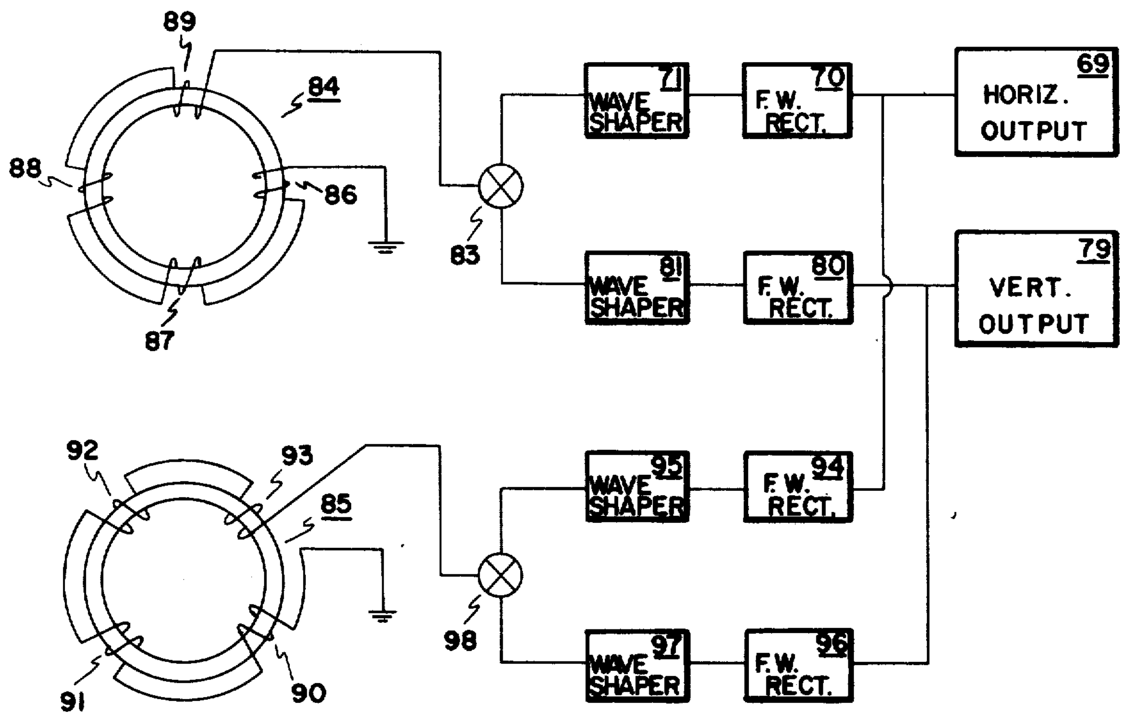
FIG. 5 is an idealized schematic diagram of another form of triad distortion correction means, utilizing two sets of windings.

Turning now to FIG. 5, there is shown another embodiment of the triad distortion correction means which is suitable for use with yokes other than those producing the beam landing pattern illustrated in FIG. 2. Here a pair of triad distortion correction means 84 and 85 are provided. Correction means 84 comprises four windings 86–89, while correction means 85 comprises four windings 90–93. As was the case for the triad distortion correction means of FIG. 4, the windings are serially connected in sets of four such that the same current passes through each winding of a set. The windings of both correction means 84 and 85 are preferably formed upon a common annular core, though alternatively they might be formed on separate cores spaced axially along the cathode ray tube neck. Means including horizontal output stage 69, full wave rectifier 70 and wave shaper 71 serve to apply horizontal-rate current having the desired waveform to one input terminal of a summer 83. Current modulated at the vertical scansion rate is derived from vertical output stage 79 and rectified by full wave rectifier 80. The resulting current is then passed through wave shaper 81 to produce the desired substantially parabolic waveform, then applied to another input terminal of summer 83. The summed signals are applied by summer 83 to the first distortion correction means 84 to provide compensation for triad distortion which achieves its maximum along horizontal and vertical axes on the viewing screen. However, with a system wherein horizontal and vertical-rate correction signals are merely added together it is likely that certain portions of the viewing screen will experience no astigmatism correction. In the embodiment of FIG. 4, for example, the vertical and horizontal currents are in bucking relationship at times during those portions of the scansion process when the diagonals of the viewing screen are being scanned.

It will therefore be recognized that in such cases additional triad distortion correction means are necessary to supplement the first triad distortion correction means 84. To this end, a second triad distortion correction means 85 is provided and oriented at substantially 45° to correction means 84. Horizontal-rate signals produced by horizontal output stage 69 are full wave rectified by a rectifier 94 and applied to a wave shaper 95 for producing substantially parabolic waveforms at the horizontal sweep frequency signals. Similarly, vertical-rate signals from vertical output stage 79 are full wave rectified by a rectifier 96 and applied to a wave shaper 97 for producing substantially parabolic waveforms at the vertical sweep frequency. A summer 98 combines the substantially parabolic waveforms produced at horizontal and vertical-rate signals and transfers them to correction means 85.

It can be shown that by combining the two sets of orthogonal magnetic fields produced by triad distortion correction means 84 and 85, one field being oriented at 45° with respect to the other, triad distortion correction can be provided in any direction over the entire viewing screen of a cathode ray tube. While in some cases it may be possible to apply to second correction means 85 the signal used to drive first correction means 84, it is anticipated that in some cases currents modulated at similar rates but with different amplitudes will be required to drive the second correction means. For this reason, it may be preferable to provide separate current rectifying and wave shaping stages for second correction means 85. Correction means 84 and 85 are preferably formed upon a common, toroidal core so that overlapping and interacting fluxes are produced at a common point along the path of the electron beams within the neck of a cathode ray tube. Further economy and efficiency may be achieved by disposing the six-pole dynamic convergence means 30 of FIG. 3 upon the same core used for correction means 84 and 85. Still further, the core utilized may be that of the deflection yoke so that deflection, convergence, and triad distortion correction may be effected at a common location along the cathode ray tube neck.

Combining the dynamic convergence, beam triad distortion correction, and deflection mechanisms at a common point along the tube neck allows the elimination of prior-art dynamic convergence assemblies and the associated pole shoes which are ordinarily appended to the forward end of the electron gun assembly within the tube neck. This in turn allows a substantial reduction in tube neck length, and when such shorter neck is combined with a wide angle viewing tube having an included deflection angle of 110° or more, a color cathode ray tube assembly is produced which is far shorter and more compact than any presently known. Such an assembly combines the advantages of a shortened color cathode ray tube with improved beam landing characteristics, facilitating production of a 110° included angle tube having picture brightness and resolution comparable to prior-art 90° tubes.

Figure 6:
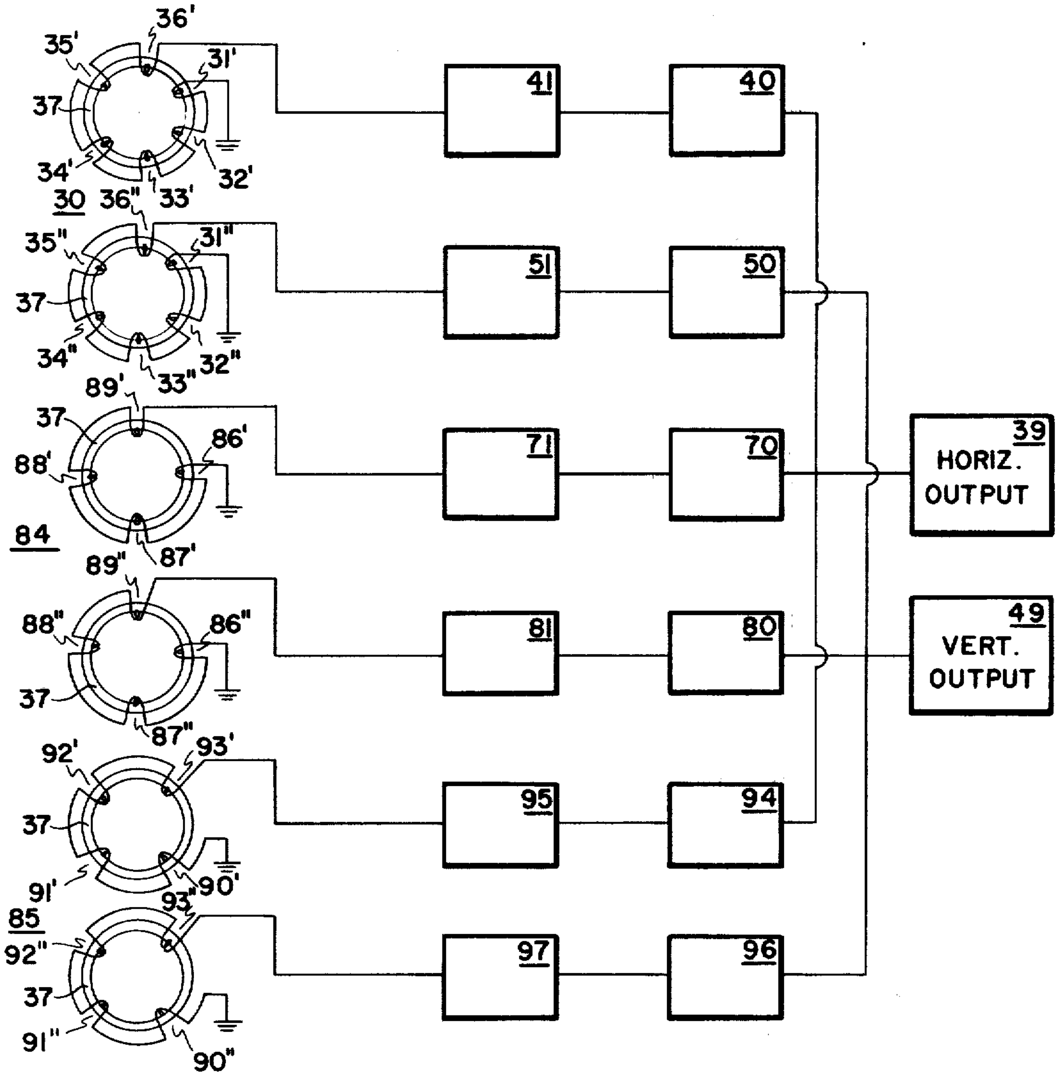
FIG. 6 is an idealized schematic diagram showing an alternative means for providing convergence and astigmatism correction.

Another embodiment of the invention is shown in FIG. 6. In this embodiment, each respective convergence and triad distortion correction means is provided with a pair of winding sets, or groups whereas only a single set group of windings is employed in the above-described embodiments. This allows horizontal-rate signals to be applied to a first group of windings and vertical-rate signals to a second group, eliminating the necessity for adding such signals before application to the windings and thereby preventing possible distortion or interaction between horizontal and vertical signal processing circuits.

In the embodiment of FIG. 6, dynamic convergence means 30 comprises a first group of six windings 31′–36′ and a second group of six windings 31″–36″, it being understood that windings having common numbers are distributed about common points upon an annular core 37. Convergence signals derived from horizontal-rate signals supplied by horizontal output stage 39 are applied to windings 31′–36″ after conversion to proper waveform by rectifier 40 and wave shaper 41 in sequence. Similarly, convergence signals derived from vertical-rate signals supplied by a vertical output stage 49 and transmitted through rectifier 50 and wave shaper 51 are applied to the other convergence windings 31″–36″.

The first quadripole triad distortion correcting means 84 comprises a first group of four windings 86′–89′ and a second set of four windings 86″–89″. As before, windings having common numbers are disposed at common locations upon an annular core, advantageously the same core 37 used for convergence means 30. The horizontal output stage 39 provides horizontal-rate signals to a rectifier 70 and a wave shaper 71 for providing suitable triad distortion correction signals to windings 86′–89′. Signals derived from vertical output stage 49 are transmitted by way of rectifier 80 and wave shaper 81 to provide triad distortion correction signals to windings 86″–89″.

The second quadripole triad distortion correction means 85 comprises a first set of four windings 90′–93′ which receive triad distortion correction signals derived from horizontal-rate signals supplied by horizontal output stage 39 and transmitted through rectifier 94 and wave shaper 95 sequentially. The other set of four windings 90″–93″ which comprises the balance of distortion correcting means 85 receives triad distortion correction signals derived from vertical-rate signals supplied by vertical output stage 49 and passed sequentially through a rectifier stage 96 and wave shaper stage 97, which stage may advantageously be similar to those utilized for driving the single set of windings which comprise triad distortion correcting means 85 in FIG. 5. It is further contemplated that windings of distortion correcting means 85 having common members will be wound at common locations upon annular core 37 together with convergence means 30 and first distortion correction means 84, with the winding locations of correction means 85 being displaced substantially 45° from the winding locations of correction means 84.

Figure 7:
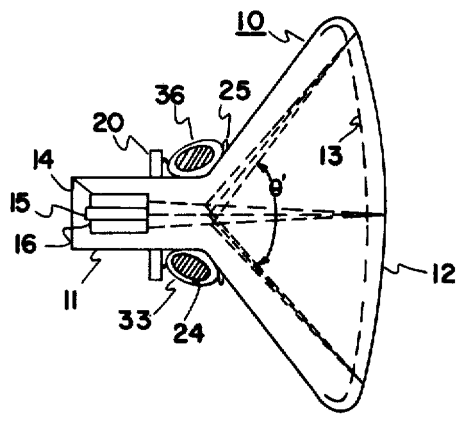
Fig. 7 is a sectional view of a color cathode ray tube and associated apparatus using the teachings of the present invention.

The system disclosed in FIG. 6 allows separate horizontal and vertical-rate signal paths to be utilized with commensurately fewer problems of interaction between driving stages, unwanted resonances, and impedance matching problems. While substantially more conductor is utilized than in the systems of FIGS. 3, 4 and 5, it is nonetheless contemplated that the windings shown in FIG. 6 may be combined upon a common core with a deflection yoke, allowing the elimination of prior-art dynamic convergence means from the neck of a color cathode ray tube. Fig. 7 illustrates a shadow-mask type color television picture tube 10 and associated deflection components, using the teachings of the present invention. It will be seen that the prior-art dynamic convergence assembly shown at 21 of FIG. 1 is absent and has been replaced by the six pole convergence apparatus shown in FIG. 3 and discussed above. Windings 33 and 36 of convergence means 30 are visible, and are formed around magnetic core 24 of the deflection yoke assembly. Original yoke windings 25 remain in their original position. Due to the absence of the separate dynamic convergence means 21, neck portion 11 of the picture tube has been shortened significantly, while still leaving room for static convergence assembly 20.

In addition to the windings of convergence means 30 of FIG. 3 being on core 24 of the yoke shown in FIG. 7, windings of triad correction means 60 of FIG. 4 are also present thereon (not visible in the illustrated section). Due to the improved triad-distortion and convergence capabilities of the combined deflection yoke, convergence means and distortion correction means, the maximum included angle of deflection $\theta$ can be expanded to 110° or more in a picture tube having a considerably shortened funnel portion.

As will be evident from the foregoing description, certain aspects of the invention are not limited to the particular details of the examples illustrated, and it is therefore contemplated that other modifications or applications will occur to those skilled in the art. It is accordingly intended that the appended claims shall cover all such modifications and applications as do not depart from the true spirit and scope of the invention.

What is claimed as new and desired to be secured by Letters Patent of the United States is:

1. Means for controlling the size and shape of a triangular array of electron beams within a color television cathode ray tube of the shadow mask type, comprising:

a first plurality of windings disposed in a substantially regular array about the neck of the cathode ray tube and producing six time-varying magnetic poles for causing the electron beams to simultaneously advance or retreat from the center of the triangular array in accordance with position of said beams within said tube; and a second plurality of windings disposed in a substantially rectangular array about the neck of the cathode ray tube and producing four time-varying magnetic poles for causing the electron beam array to expand in a first direction and contract in a second direction perpendicular to the first direction in accordance with position of said beams within said tube.

2. The invention defined in claim 1 wherein said first and said second plurality of windings are disposed about a common point along the neck of the cathode ray tube.

3. The invention defined in claim 2, further including annular core means adapted to receive the neck of the cathode ray tube, wherein said first and said second plurality of windings are disposed upon said core means.

4. The invention defined in claim 3, further including a third plurality of windings adapted to produce four magnetic poles disposed in a substantially rectangular array about the neck of the cathode ray tube, said rectangular array being oriented at substantially 45° to the rectangular array produced by said second plurality of windings, for causing the electron beam array to expand in a third direction and contract in a fourth direction perpendicular to said third direction.

5. In a television receiver including a cathode ray tube including electron gun means for producing three electron beams in a triangular array and having a neck portion and face portion and including deflection means for deflecting said electron beam array in a vertical and a horizontal direction, said deflection means being adapted to produce substantially no distortion of said beam array along the diagonals of the face of the cathode ray tube:

a first set of windings disposed about the neck portion of the cathode ray tube for producing a first magnetic field having flux lines extending in a substantially hexagonal configuration;

means for applying time-varying currents to said first set of windings for varying the convergence of the electron beams in synchronism with the deflection thereof;

a second set of windings disposed about the neck portion of the cathode ray tube for producing a second magnetic field therein having flux lines extending in a substantially quadrilateral configuration; and means for applying a second time-varying current to said second set of windings for elongating the electron beam array in a first direction and compressing it in a second direction perpendicular to the first direction in synchronism with the deflection of the electron beams.

6. The invention defined in claim 5, wherein said first and said second sets of windings are disposed at a common position along the axis of the neck of said cathode ray tube.

7. The invention defined in claim 6, wherein said first set of windings comprises two groups of six windings each, one of said groups being adapted to receive time-varying currents which vary in synchronism with horizontal deflection of the electron beams, the other group of windings being adapted to receive time-varying current which varies in synchronism with vertical deflection of the electron beams; and wherein said second set of windings comprises two groups of four windings each, one of said groups being adapted to receive time-varying current which varies in synchronism with horizontal deflection of the electron beams, the other of said groups being adapted to receive time-varying current which varies in synchronism with vertical deflection of the electron beams.

8. The invention defined in claim 7, further including annular core means disposed about the neck of the cathode ray tube, wherein said first and said second sets of windings are disposed upon said core means.

9. The invention defined in claim 8, wherein said core means is the core of said deflection means.

10. The invention defined in claim 6, wherein said first set of windings comprises six series-connected windings disposed in regular fashion about the neck of the cathode ray tube, and said second set of windings comprises four series-connected windings disposed in regular fashion about the neck of the cathode ray tube.

11. In a televison receiver including a cathode ray tube having electron gun means therein adapted to produce three electron beams disposed in a substantially triangular array and having a neck portion and a faceplate portion, said receiver further including deflection yoke means including a core for deflecting the arrayed electron beams in a vertical and a horizontal manner, the combination comprising convergence means disposed adjacent the neck portion of the cathode ray tube for producing a magnetic field therein characterized by flux lines extending in a substantially hexagonal manner;

means for applying time-varying current to said convergence means for varying the convergence of the electron beams in synchronism with the deflection thereof;

first triad distortion correction means disposed adjacent the neck of the cathode ray tube for producing a magnetic field therewithin characterized by lines of flux extending in a substantially quadrilateral array;

means for applying time-varying current to said triad distortion means for modifying the shape of the electron beam array in synchronism with the deflection;

second triad distortion correction means comprising means adjacent the neck of the cathode ray tube for producing a magnetic field therein characterized by lines of flux extending in a substantially rectangular array, said rectangular array being oriented at substantially 45° to said rectangular array produced by said first triad distortion correction means; and means for applying a time-varying current to said second triad distortion correction means for modifying the shape of the electron beam array in synchronism with the deflection thereof.

12. The invention defined in claim 11, wherein said convergence means comprises two groups of six series-connected windings, one of said windings being adapted to produce a magnetic field which varies in synchronism with horizontal deflection of the electron beam array, the other of said windings being adapted to produce a magnetic field which varies in synchronism with vertical deflection of the electron beam array;

said first triad distortion correction means comprises two groups of four series-connected windings each, said first group being adapted to produce a magnetic field which varies in synchronism with horizontal deflection of the electron beam array, said second group being adapted to produce a magnetic field which varies in synchronism with vertical deflection of the electron beam array; and said second triad distortion correction means comprises two groups of four series-connected windings each, said first group being adapted to produce a magnetic field which varies in synchronism with horizontal deflection of the electron beam array, said second group of windings being adapted to produce a magnetic field which varies in synchronism with vertical deflection of the electron beam array.

13. The invention defined in claim 12, further including annular core means disposed about the neck of the cathode ray tube, wherein all of the windings of said convergence means and said triad distortion correction means are disposed upon said core means.

14. The invention defined in claim 13, wherein said core means is the core of said deflection yoke means.

15. The invention defined in claim 11, wherein said convergence means comprises six series-connected windings adapted to receive current which varies in synchronism with horizontal and vertical deflection of the electron beam array;

said first triad distortion correction means comprises four series-connected windings adapted to receive current which varies in synchronism with horizontal and vertical deflection of the electron beam array; and said second triad distortion correction means comprising four series-connected windings adapted to receive current which varies in synchronism with horizontal and vertical deflection of the electron beam array.

16. The invention defined in claim 15, further includes annular core means disposed about the neck of the cathode ray tube, wherein the windings of said convergence means and said triad distortion correction means are disposed upon said core means.

17. The invention defined in claim 16, wherein said core means is the core of said deflection yoke.

18. The invention defined in claim 13 wherein the windings of said first triad distortion correction means are spaced substantially 90° apart upon said annular core means and the windings of said second triad distortion correction means are spaced substantially 90° apart upon said annular core means, the windings of said second triad distortion correction means being displaced from the windings of said first triad distortion correction means by substantially 45°.

19. The invention defined in claim 16 wherein the windings of said first triad distortion correction means are spaced substantially 90° apart upon said annular core means and the windings of said second triad distortion correction means are spaced substantially 90° apart upon said annular core means, the windings of said second triad distortion correction means being displaced from the windings of said first triad distortion correction means by substantially 45°.

* * * * *